US006723297B2

(12) United States Patent
Chen et al.

(10) Patent No.: US 6,723,297 B2
(45) Date of Patent: Apr. 20, 2004

(54) AMORPHOUS SILICA-ALUMINA, A CARRIER COMBINATION AND A HYDROCRACKING CATALYST CONTAINING THE SAME, AND PROCESSES FOR THE PREPARATION THEREOF

(75) Inventors: Song Chen, Liaoning (CN); Tingyu Li, Liaoning (CN); Guangwei Cao, Liaoning (CN); Minghua Guan, Liaoning (CN)

(73) Assignees: China Petrochemical Corp., Beijing (CN); Fushun Research Institute of Petroleum & Petrochemical, SINOPEC, Liaoning Province (CN)

( * ) Notice: Subject to any disclaimer, the term of this patent is extended or adjusted under 35 U.S.C. 154(b) by 7 days.

(21) Appl. No.: 10/131,100

(22) Filed: Apr. 25, 2002

(65) Prior Publication Data
US 2002/0160906 A1 Oct. 31, 2002

Related U.S. Application Data

(62) Division of application No. 09/438,952, filed on Nov. 12, 1999, now Pat. No. 6,399,530.

(30) Foreign Application Priority Data

Nov. 13, 1998 (CN) ............................ 98114459

(51) Int. Cl.$^7$ ......................... C01B 33/20; C01B 33/26; C01B 33/24; B01J 21/04; B01J 23/02
(52) U.S. Cl. ................ 423/326; 423/327.1; 423/327.2; 423/328.1; 423/328.2; 423/330.01; 423/331; 502/439
(58) Field of Search .......................... 502/64, 73, 351, 502/355, 407, 415, 439; 501/68, 69, 133, 153, 154; 423/326, 327.1, 327.2, 328.1, 328.2, 330.01, 331, 335

(56) References Cited

U.S. PATENT DOCUMENTS

| 3,617,510 A | 11/1971 | Hayes |
| 3,716,597 A | 2/1973 | Mitsche et al. |
| 3,723,552 A | 3/1973 | Mitsche et al. |
| 4,259,212 A | 3/1981 | Gladrow et al. |
| 4,500,645 A * | 2/1985 | Fuchikami et al. ........... 502/65 |
| 4,517,074 A | 5/1985 | Ward |
| 4,588,701 A | 5/1986 | Chiang et al. |
| 4,738,941 A | 4/1988 | Dufresne et al. |
| 4,758,330 A | 7/1988 | Kidd |
| 4,767,733 A | 8/1988 | Chester et al. |
| 4,914,067 A | 4/1990 | Pellet et al. |

(List continued on next page.)

FOREIGN PATENT DOCUMENTS

| EP | A2-0228270 | 7/1987 |
| GB | A-2166971 | 5/1986 |

Primary Examiner—Cam N. Nguyen
(74) Attorney, Agent, or Firm—Birch, Stewart, Kolasch & Birch, LLP

(57) ABSTRACT

An acidic amorphous silica-alumina having large specific surface area and a large pore volume, a carrier complex and a hydrotreating catalyst containing said acidic amorphous silica-alumina, in particular a hydrocracking catalyst containing said acidic amorphous silica-alumina in combination with a modified zeolite-Y for treating petroleum hydrocarbon materials to produce middle distillates, and processes for the preparation thereof. Said amorphous silica-alumina has a $SiO_2$ content of 10–50 wt %, a specific surface area of 300–600 m$^2$/g, a pore volume of 0.8–1.5 ml/g and an IR acidity of 0.25–0.60 mmol/g. The catalyst according to the present invention shows a relatively high activity and mid-distillate selectivity and can be particularly used in hydrocracking process for producing mid-distillates in a higher yield.

22 Claims, 1 Drawing Sheet

U.S. PATENT DOCUMENTS

| | | | |
|---|---|---|---|
| 5,055,442 A | * 10/1991 | Osaka et al. | 502/439 |
| 5,135,756 A | 8/1992 | Shi et al. | |
| 5,188,996 A | * 2/1993 | Huang et al. | 502/37 |
| 5,190,903 A | 3/1993 | Steigleder | |
| 5,393,410 A | 2/1995 | Habib et al. | |
| 5,453,411 A | 9/1995 | Dai et al. | |
| 5,468,700 A | 11/1995 | Ward | |
| 5,500,109 A | 3/1996 | Keville et al. | |
| 5,762,902 A | 6/1998 | Benazzi et al. | |
| 5,789,336 A | * 8/1998 | Pazzucconi et al. | 502/240 |
| 5,834,522 A | * 11/1998 | Mignard et al. | 518/700 |
| 5,954,944 A | 9/1999 | Zhang et al. | |
| 5,954,947 A | 9/1999 | Mignard et al. | |
| 5,961,816 A | 10/1999 | Benazzi et al. | |
| 5,976,351 A | 11/1999 | Apelian et al. | |
| 5,977,425 A | 11/1999 | Brandes et al. | |
| 6,027,706 A | * 2/2000 | Pinnavaia et al. | 423/600 |
| 6,037,300 A | 3/2000 | Kasztelan et al. | |
| 6,045,687 A | 4/2000 | Mignard et al. | |
| 6,174,429 B1 | 1/2001 | George-Marchal et al. | |

* cited by examiner

AMORPHOUS SILICA-ALUMINA, A CARRIER COMBINATION AND A HYDROCRACKING CATALYST CONTAINING THE SAME, AND PROCESSES FOR THE PREPARATION THEREOF

This application is a divisional application of Application Ser. No. 09/438,952, filed Nov. 12, 1999 now U.S. Pat. No. 6,399,530. This application claims priority under 35 U.S.C. §119 of Chinese Application No. 98114459.4, filed Nov. 13, 1998, the entire contents of which is hereby incorporated by reference.

FIELD OF THE INVENTION

The present invention relates to an acidic amorphous silica-alumina having a large specific surface area and a large pore volume, a carrier complex and a hydrotreating catalyst containing the same, in particular a hydrocracking catalyst containing the acidic amorphous silica-alumina in combination with a modified zeolite-Y for treating petroleum hydrocarbon materials to produce middle distillates, and processes for the preparation thereof.

BACKGROUND OF THE INVENTION

The amorphous silica-alumina, as one-of the important support components of catalysts, is required to have an adequately large specific surface area and large pore volume to support active metal components. Additionally, the amorphous silica-alumina also needs generally to provide a certain acid cracking function for efficient reaction. However, none of the disclosed products of the prior arts possesses both functions. Commonly, the amorphous silica-alumina used as an acidic component should be dispersed in a matrix of refractory oxides having a large specific surface area and a large pore volume, such as a large pore alumina, which may serve jointly as a catalyst support. Due to limitations in the preparation processes of the prior art, when an amorphous silica-alumina which is required to have a desired pore structure that can be used directly as a catalyst support is prepared, silica introduced into it cannot be sufficient, and consequently the number of acid sites is low; on the other hand, if sufficient silica is added to increase the number of acid sites, it is liable to crystallize and will cause damage to the pore structure. Particularly, with respect to the mid-distillate type hydrocracking catalyst, in addition to the activity of the catalyst, its mid-distillate selectivity should be especially taken into consideration. Thus, in addition to a certain amount of acid sites, the carrier component is required to have comparatively good properties in respect of pore structure, including a larger specific surface area and more effective pore volume to improve the dispersion of active metal components in the carrier and to modify the diffusion properties in the coursr of reaction. The application of zeolite component in catalysts enhances the activity level of the catalysts, in particular that of the hydrocracking catalysts. The application of zeolite component in catalysts marks a great progress in the field of hydrocracking catalyst as compared with the catalysts comprising solely amorphous silica-alumina. Zeolite is first applied in light-distillate type hydrocraking catalysts, and latter in mid-distillate type hydrocraking catalysts. However, with respect to a mid-distillate type hydrocraking catalyst, the activity may not be the most important element to be considered, but the mid-distillate selectivity is very important. It is true that a large amount of zeolite can enhance the cracking activity of the catalyst, but its excessively strong cracking activity may result in noticeable decrease in the mid-distillate selectivity. Therefore, it needs to seek a better balance between the activity and the mid-distillate selectivity of the catalyst.

GB 2166971A discloses a silica-alumina cogel having a specific surface area of 100–400 m$^2$/g, of which 30–60% is contributed by the pores having a diameter of about 4–10 nm, and a process for the preparation thereof, comprising first mixing an alkali metal aluminate and silicate to obtain a mixture having a pH of about 12 to 12.5, and then reacting the mixture with aluminum sulfate to obtain the resultant product. From the examples of the application, it can be learned that the typically resultant product $SiO_2$—$Al_2O_3$—$Re_2O_3$ cogel has a specific surface area of 277 m$^2$/g, a pore volume of 0.31 ml/g and an average pore diameter of 6.1 nm respectively under the conditions that its $SiO_2$ content is less than 35 wt %. Although the said product possesses cracking activity, it has the defects of being small in pore volume and specific surface area and cannot be used as a carrier alone for supporting a large amount of metal components.

U.S. Pat. No. 4,758,330 discloses a catalyst composition having a high surface area and a high pore volume comprising alumina as the major component and silica as a minor modifying component, and also discloses a process for preparing an amorphous silica-alumina by first preparing an alumina hydrogel by pH swing preparation in a range of 2 to 10, and then adding to the hydrogel a silicate to obtain the amorphous silica-alumina. The process is complicated in operation and difficult to control, and moreover the obtained product has a low $SiO_2$ level (less than 8.7 wt %), so it is generally used as a carrier of a hydrofining catalyst, which is not required to have the function of acidic cracking. Although this product has a pore volume of up to 1.78 ml/g, its pore volume is contributed substantially by large pores of 10–100 nm, and only 0.31 ml/g by pores of 3–10 nm, and this product has a specific surface area of 308 m$^2$/g.

EP 0,228,270 describes a process by which alumina is treated with sodium silicate or silica sol, and is then subjected to hydrothermal treatment to improve the properties of the amorphous silica-alumina and to give the final amorphous silica-alumina having a $SiO_2$ content of 6–12 wt %. In an embodiment of the invention, the alumina is treated with a silica sol, and then the resultant amorphous silica-alumina containing 12 wt % of $SiO_2$ is treated by a hydrothermal method in order to give a product having the highest specific surface area, however, even in this case, the specific surface area is only 214 m$^2$/g. The operational conditions of the process described above are rigorous and energy consumption in the hydrothermal treatment is large.

U.S. Pat. No. 4,517,074 discloses a hydrocracking catalyst for producing 300–700° F. (149–371° C.) middle distillates, wherein the feedstocks are preferably pretreated by hydro-denitrogenation and/or hydro-desulfurization. Said catalyst is characterized in that it comprises, in addition to a zeolite component, a dispersion of $SiO_2$-$Al_2O_3$ in alumina matrix, wherein the amorphous silica-alumina having a certain level of cracking activity has to be dispersed into an alumina matrix, such as large-pore γ—$Al_2O_3$ used as a component of the carrier, so as to obtain sufficient pore volume and specific surface area for supporting a large amount of metal components for hydrogenation, according to its embodiment example, the activity of catalyst is relatively low, thus, in order to achieve a conversion of 60 vol %, the reaction temperature must generally be higher than 400° C. While the reaction temperature is still needed to be kept at 389° C. even though an example of the patent showed that by the use of a catalyst comprising a silica-alumina containing as high as 75% of silica dispersed in γ—$Al_2O_3$ in combination with a zeolite, such as zeolite LZ-10.

Therefore, there is still a need in the art to develop a hydrocracking catalyst having both good activity and high mid-distillate selectivity, and a process for the preparation thereof.

After extensive studies and experiments, the inventors have invented an acidic amorphous silica-alumina having a large specific surface area and a large pore volume and a process for the preparation thereof. When used as a carrier component, preferably in combination with a zeolite-Y, the acidic amorphous silica-alumina will provide a hydrocracking catalyst with the desirable properties including both good activity and high mid-distillate selectivity.

SUMMARY OF THE INVENTION

An object of the present invention is to provide an amorphous silica-alumina having a large specific surface area and a large pore volume and an adequate content of $SiO_2$ to ensure a desired acid function for chemical reactions, which is particularly useful as a carrier component in the preparation of a hydrocracking catalyst having both good activity and high mid-distillate selectivity.

Another object of the present invention is to provide a carrier complex comprising an acidic amorphous silica-alumina of the present invention, which is particularly useful as carrier component in the preparation of a hydrocracking catalyst having both good activity and high mid-distillate selectivity for producing mid-distillate.

A further object of the present invention is to provide a hydrocracking catalyst, comprising hydrogenation metal components, a specific amorphous silica-alumina, and optionally a crystalline compound including a zeolite, which has both good activity and high mid-distillate selectivity and is particularly useful in treating heavy hydrocarbon materials to produce middle distillates.

Anther still further object of the present invention is to provide a hydrocracking catalyst, comprising hydrogenation metal components, a specific amorphous silica-alumina, and a modified ultrahydrophobic zeolite-Y, which has both good activity and high mid-distillate selectivity and is particularly useful in treating heavy hydrocarbon materials to produce middle distillates.

A still further object of the present invention is to provide a process for the preparation of an acidic amorphous silica-alumina having a large specific surface area and a large pore volume, with simplified procedures and lower costs for starting materials and lower energy consumption.

Still another object of the present invention is to provide a process for the preparation of the catalyst of the present invention, comprising the steps of mixing a specific amorphous Silica-alumina, optionally a crystalline compound including a zeolite, and optionally a binder, kneading, rolling, pressing and moulding into carrier, and then supporting active hydrogenation metals onto said carrier to obtain the catalyst of the invention.

These and other objects of the present invention will become apparent to the person skilled in the art after reading the specification.

DETAILED DESCRIPTION OF THE INVENTION

Figure 1:
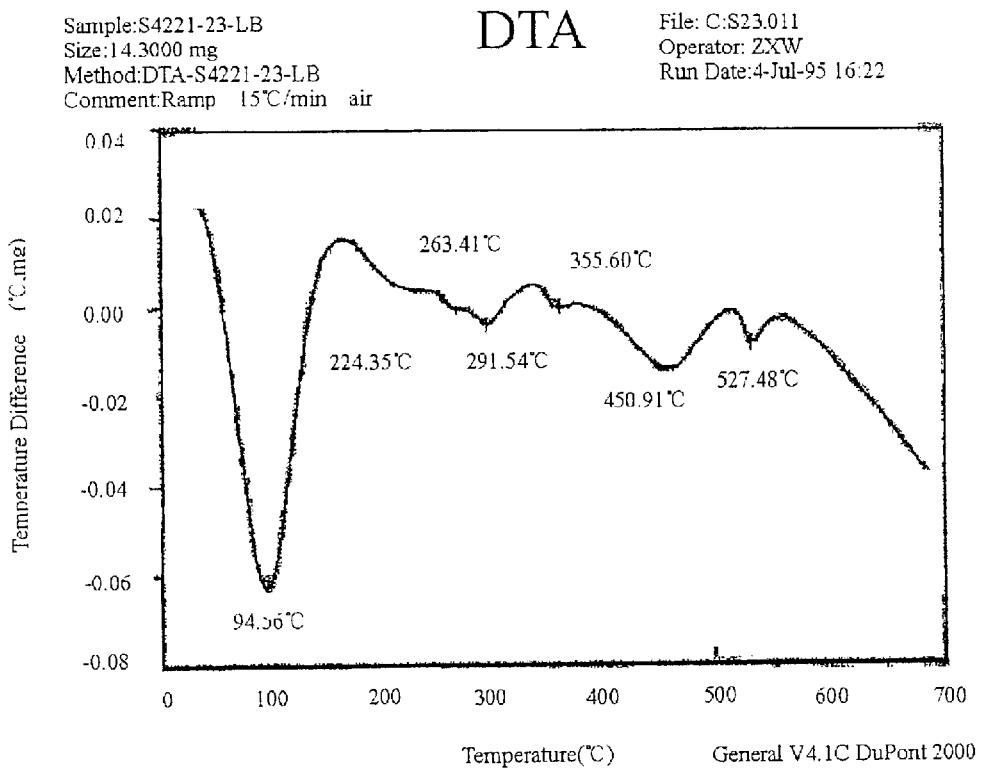
FIG. 1 is a DTA scan of a pre-matrix of alumina.

The silica-alumina according to the present invention is substantively amorphous and has a $SiO_2$ content of 10–50 wt %, a specific surface area of 300–600 m²/g, a pore volume of 0.8–1.5 ml/g, and an acidity measured by an infrared method (conducted by an acidimeter Necolet 550, herein after referred to as IR acidity) of 0.25–0.60 mmol/g.

Preferably, the amorphous silica-alumina according to the present invention has a $SiO_2$ content of 15–50 wt %, and more preferably 20–40 wt %.

Preferably, the amorphous silica-alumina according to the present invention has a specific surface area of 350–600 m²/g, more preferably 400–550 m²/g, and most preferably 450–500 m²/g.

Preferably, the amorphous silica-alumina according to the present invention has a pore volume of 0.9–1.4 ml/g, more preferably 1.0–1.4 ml/g, and most preferably 1.0–1.3 ml/g.

Preferably, the amorphous silica-alumina according to the present invention has an IR acidity of 0.30–0.55 mmol/g, more preferably 0.35–0.50 mmol/g, and most preferably 0.40–0.45 mmol/g.

The amorphous silica-alumina according to the present invention may optionally contains phosphorus, preferably of 1–5 wt % calculated as $P_2O_5$.

According to the present invention, the amorphous silica-alumina is prepared by a process with parallel flows and a fixed pH. The principle of the preparation of the amorphous silica-alumina according to the present invention is based on that a pre-matrix of alumina is formed first and an appropriate initiative heterogeneous crystal form, which will shift to amphourous statein the following step, is obtained by controlling the neutralization conditions as described below, then the positions of aluminum atoms are replaced by silicon atoms. This is different from the processes of the prior arts in which alumina is impregnated with silicon source and the silicon atoms simply precipitate onto alumina, thus the acidity cannot be greatly increased and the pores in the support will be damaged. Unlike the processes of the prior arts in which the amount of silicon added will influence considerably the specific surface area and core volume of the final products, the process of the present invention can form an amorphous silica-alumina with a high specific surface area and a large pore volume, even if the silica level of the product varies in a very wide range. The preparation of the amorphous silica-alumina of the present invention features that aluminum atoms are attacked and replaced by silicon atoms in a prevailing concentration in a short time, thereby forming the skeletons of a large number of original acid sites, which manifest substantially the feature of Lewis acid owing to the presence of free aluminum and the subsequent amorphous transformation. Then, the replaced aluminum atoms enter into the sol system, together with excess aluminum atoms in the system, form continuously new colloidal particles which interact with the germinal $Al_2O_3$ and $SiO_2$, while germinal silica-alumina grow and aggregate to form larger colloidal particles. Under a certain aging condition, the crystalline growth is destroyed for transformation into amorphous form is undergoing. With the above-described features, the amorphous silica-alumina of the present invention has not only a higher acidity, but also a higher specific surface area and a large pore volume because of a high level of amorphism as compared with the products of the prior arts in this field. Thus, the amorphous silica-alumina of the present invention needs not to undergo further hydrothermal treatment or other methods for enlarging the pores.

The amorphous silica-alumina according to the present invention can be prepared in the following steps:

(a) adding in parallel flows an acidic aluminum salt solution and a basic precipitant solution, or a basic aluminum salt solution and an acidic precipitant solution, into a reactor containing a small amount of de-ionized water and carrying out the neutralization reaction to form a colloidal sol;

(b) optionally stabilizing the resulting sol from step (a);

(c) adding a silicon compound to the resultant from step (b);

(d) aging the mixture from step (c);

(e) filtering and washing the resultant from step (d); and (f) where necessary, adding a phosphorus compound, filtering the resultant; and (g) drying the resultant (e) or (f) and crashing it to obtain the amorphous silica-alumina product.

In the process for preparing the amorphous silica-alumina as described above, the acidic aluminum salt may be any soluble acidic aluminum salt which can react with a basic precipitant to form an appropriate colloidal sol of alumina, and is preferably selected from the group consisting of $Al_2(SO_4)_3$, $Al(NO_3)_3$ and $AlCl_3$, and in the industrial application, $Al_2(SO_4)_3$ is more preferably used because of its low price; the basic precipitant may comprise any soluble base, for example, an alkali or alkali earth metal hydroxide, carbonate, bicarbonate, aluminate, aqueous ammonia, etc., and is preferably selected from the group consisting of NaOH, $NH_4OH$ and $NaAlO_2$. In the case that a basic aluminum salt and an acidic precipitant are used in step (a), said basic aluminum salt may be a soluble alkali or alkali earth metal aluminate, preferably an alkali metal aluminate and more preferably sodium aluminate ($NaAlO_2$); and said acidic precipitant may be an acidic aluminated such as $Al_2(SO_4)_3$, $Al(NO_3)_3$ and $AlCl_3$ or inorganic acid such as hydrochloric acid, sulfuric acid and nitric acid, or an organic acid such as sulfonic acid and carboxylic acid such as formic acid and acetic acid, and an acidic material as defined above for the acidic aluminum salt etc. In general, different precipitants will make the alumina matrix obtained from step (a) different in particle sizes. The basic precipitants which can lead to different sizes of alumina colloidal particles are listed in the following order based on the resultant particle sizes: $NaOH<NaAlO_2<NH_4OH$. The said silicon compound used in step (c) may be any organic silicon compound which can introduce silica to produce the amorphous silica-alumina product, and is preferably selected from the group consisting of silicate, waterglass, a silica sol and other silicon compounds, more preferably sodium silicate, waterglass and silica sol. In the process of this invention, different precipitants can be used for preparing the amorphous silica-alumina of the present invention having properties within the desired ranges. To meet the different requirements of various catalytic reactions, these products with different pore diameters and pore distribution can be obtained by adjusting the reaction conditions.

The acidic amorphous silica-alumina having a high specific surface area and a large pore volume and having desired properties can be obtained under different conditions described below. The silica-alumina product having different pore diameters and pore distribution resulted from the change in conditions may be used in various catalytic reactants and reaction types. And for different purposes of use, various amorphous silica-alumina having different acidic cracking functions may be required, and such an amorphous silica-alumina having a certain level of acidity and cracking activity can be prepared by adjusting the amount of silicon compound added in the course of the preparation. Contrary to the prior art process in which the amount of added silicon compound will obviously affect the specific surface area and pore volume of the product, the process according to the present invention can provide an acidic amorphous silica-alumina having a high specific surface area and a large pore volume in a very wide range of $SiO_2$ content. For example, when the amorphous silica-alumina product of the present invention has a 45 wt % $SiO_2$ content, it still included in the scope of the present application.

In step (a) of the above process, the addition can be operated at room temperature; the starting solutions can be added in an appropriate concentration, for example, the acidic aluminum salt solution can be used at a concentration of 4–20 g/100 ml, and as a basic precipitant, for example, sodium aluminate can be used at a concentration of 10–30 g/100 ml and aqueous ammonia at about 8–12 v %, and the neutralization reaction can be carried out at a temperature of 50–80° C., a pH value of 6.0–10.0 or a sufficient period of time, for example, for 0.5–2 hrs, preferably 1–2 hrs.

In step (b), the stabilization can be carried out at room temperature and a pH value of 6–9 for a sufficient period of time, for example, for 0–60 mins.

In step (c), because of the features and mechanism of the preparation process according to the invention as described above, the addition of silicon compound into the resultant from step (b) should be completed in a short time so as to ensure that in a certain period a prevailing concentration of silicon ions can be obtained to attack the alumina pre-matrix formed in this reaction system. Of course, the adding period cannot be too short regarding to the efficiency of mass transfer under stirring. The adding period is preferably 5–20 mins.

After a silicon source is introduced, the pH value in this system will be subjected to a changing course, showing that amorphous silica-alumina starts being formed on the alumina matrix. After the reaction equilibrium is achieved, the appropriate conditions should continuously be maintained to complete step (d). This procedure is an aging process in a broad sense, that is, the procedure comprises both the step of forming amorphous silica-alumina in the reaction and the subsequent step of amorphous transforming of the resultant. In this step, the aging can be carried out at a pH value of 7.5–9.5, and a temperature of 50–70° C. for 0–60 mins.

After aging, the steps (e) and (g) can be carried out in a conventional way, that is, the resultant amorphous silica-alumina is washed to remove impurities such as iron ions, sodium ions, sulfate ions, chloride ions, etc., and then dried and crashed to give the amorphous silica-alumina of the present invention. The purpose of removing the impurities is to ensure that the impurities in amorphous silica-alumina will be reduced to such a level that they cannot affect the activity and stability of the catalyst when the amorphous silica-alumina according to the invention is used as a catalyst support or an acidic component of the catalyst.

The amorphous silica-alumina of the present invention can be dried in an oven or by spraying, for example, dried in an oven at a temperature of 90–120° C., preferably about 110° C. for 6–10 hrs, to make the dry matrix of the amorphous silica-alumina produced be up to 60–80 wt %. Then, the dried amorphous silica-alumina is sieved into preferably smaller than 150 mesh, more preferably smaller than 200 mesh.

The amorphous silica-alumina of the present invention may optionally comprise 1–5 wt % of phosphorus (calculated as $P_2O_5$) in order to improve the distribution of pore diameters and the said phosphorus may also have delicate effects on the properties of a catalyst containing the amorphous silica-alumina. Said amorphous silica-alumina containing phosphorus can be obtained by slurrying again the above amorphous silica-alumina, adding a proper amount of phosphorous compound such as phosphoric acid, so that the product contains 1–5 wt % $P_2O_5$ based on the total weight of the amorphous silica-alumina, then filtering, drying and crashing to give the product containing phosphorus.

The amorphous silica-alumina mentioned above may be used alone or in combination with a crystalline compound including a zeolite component, optionally alumina and optionally other refractory oxides as a carrier. Therefore, the present invention further provides a carrier complex containing the amorphous silica-alumina having a dual-function as a component, which comprises:
 (a) 10–90 wt % of the amorphous silica-alumina according to the present invention,
 (b) 0–60 wt % of a crystalline compound including a zeolite component, and
 (c) 0–60 wt % of an alumina and/or other refractory oxides.

Preferably, the carrier combination according to the present invention comprises:
 (a) 15–80 wt % of the amorphous silica-alumina according to the present invention,
 (b) 5–50 wt % of a crystalline compound including a zeolite component, and
 (c) 5–50 wt % of an alumina and/or other refractory oxides.

Preferably, the carrier combination according to the present invention comprises:
 (a) 20–70 wt % of the amorphous silica-alumina according to the present invention,
 (b) 10–40 wt % of a crystalline compound including a zeolite component, and
 (c) 10–40 wt % of an alumina and/or other refractory oxides, Where the carrier complex mentioned comprises no component (b), it should comprises (c), and where it comprises no (c), it should comprises (b) The alumina used in the carrier complex of the present invention can be either a large pore alumina or a small pore alumina, preferably a small pore alumina, and more preferably, a small pore alumina which is peptized with nitric acid and has a specific surface area of 240–280 $m^2/g$ and a pore volume of 0.4–0.5 ml/g.

The refractory oxide optionally used in the carrier complex according to the present invention may he any mentioned the following, for example, zinc oxide, zirconium oxide, titanium oxide, magnesium oxide, and the like.

The crystalline compound used as a component of the complex include a various kinds of crystal alumisilicate and zeolites. Those zeolites which are commonly used as a component in the catalyst of the art, including zeolite-Y, zeolite-β, zeolite-ZSM, zeolite-SAPO, etc. may also be used in the carrier complex. The zeolite used in the carrier combination is preferably a zeolite-Y, and more preferably a modified ultra-hydrophobic zeolite-Y.

Most preferably, the ultra-hydrophobic zeolite-Y used in the carrier complex according to the invention has an $SiO_2/Al_2O_3$ molar ratio of 5–25, an IR acidity of 0.2–0.5 mmol/g and a sorptive capacity for water vapor of less than 5 wt % at 25° C. and $P/P_0$ of 0.1. Preferably, said ultra-hydrophobic zeolite-Y has a $SiO_2/Al_2O_3$ molar ratio of 6.0–17; and has an appropriate proportion of non-skeletal alumina, which accounts for 10–50 wt % based on the total weight of alumina contained in the zeolite; a very narrow range of crystal unit cell size, generally between 2.420 and 2.445 nm, most preferably between 2.425 and 2.435 nm. The ultra-hydrophobic zeolite-Y most preferably used in the carrier complex according to the present invention has obviously secondary pores, that is, the modified zeolite-Y has an increased number of pores, accompanied by the increase in specific surface area and pore volume. Said zeolite-Y has a specific surface area of 600–850 $m^2/g$, preferably 700–800 $m^2/g$; a pore volume of 0.2–0.6 ml/g, preferably 0.3–0.5 ml/g, with more than 50% of the total pore volume being contributed by the secondary pores having diameters of over 2 nm, and an IR acidity of preferably 0.25–0.5-mmol/g.

The carrier complex of the present invention can be prepared by mixing 10–90 wt % of the amorphous silica-alumina according to the present invention, 0–60 wt % of a crystalline compound including a zeolite component, and 0–60 wt % of an alumina and/or other refractory oxide, kneading, rolling and pressing the blend into block mass, and extrusion moulding the block mass by an extruder into carrier bars to obtain the carrier complex of the present invention.

The moulded carrier bars may be in any suitable shape, for example, in a cylindrical shape having a diameter of 1.2–1.8 mm, or in the specific shapes, such as trefoil or quatrefoil in cross-section. The moulded carrier bars can be dried at a temperature of 90–160° C., preferably 110–140° C. for 6–12 hours, preferably 8–10 hours, and activated by calcination at a temperature of 400–650° C., preferably 450–600° C. for 1–10 hours, preferably 3–6 hours to obtain the carriers ready for use.

The modified ultra-hydrophobic zeolite-Y most preferably used in the carrier complex according to the invention may be prepared in the following steps:
 (1) preparing a zeolite-Y having a $Na_2O$ content of less than 0.2 wt %;
 (2) adding the zeolite-Y to a calcining oven, calcining at 450–700° C. and under a pressure of 0.1–1.0 MPa of water vapor produced on-site or additionally introduced, for 0.5–10 hours to obtain an ultra-hydrophobic zeolite-Y having a $SiO_2/Al_2O_3$ molar ratio of 5.2–6.0.

The ultra-hydrophobic zeolite-Y obtained according to the above steps may be further dealuminized selectively by a chemical method to obtain an ultra-hydrophobic zeolite-Y having a $SiO_2/Al_2O_3$ molar ratio of 6.5–25. The chemical method for the selective dealuminization is carried out to remove selectively the non-skeletal alumina in the zeolite with a solution of an acid, such as hydrochloric acid, nitric acid, acetic acid, oxalic acid and the like, or of an organic complexing agent, such as acetylacetone, ETDA and the like.

And the zeolite-Y having a $Na_2O$ content of less than 0.2 wt % can be prepared according to the following methods of (a) or (b):
 (a) stirring a commercial zeolite NaY as starting material in an ammonium ion-exchanging solution having a concentration of 1.0–5.0M, preferably 2.0–3.0M, in which the concentration of the zeolite NaY is 0.05–1.0 g/ml, preferably 0.1–0.5 g/ml, at a temperature of 70–150° C., preferably 80–120° C., for 0.5–3 hours, and repeating the above ion-exchanging step again and again till a zeolite-Y having a $Na_2O$ content of less than 0.2 wt % is obtained.
 (b) ion-exchanging a commercial starting material zeolite NaY according to the same ion-exchanging method as mentioned in (a) for 2–3 times to obtain the zeolite-Y product having a $Na_2O$ content of less than 3.0 wt %, which is then hydrothermally treated at 450–600° C. and under a vapor pressure of 0.01–0.2 MPa for 0.5–3 hours; then ion-exchanging the resulting zeolite-Y by the same ion-exchanging method as mentioned in (a) for 2–3 times to obtain the zeolite-Y having a $Na_2O$ content of less than 0.2 wt %.

The carrier complex according to the present invention can be used alone directly as a carrier of a catalyst which needs a carrier having a certain degree of acidity function and having large specific surface area and pore volume to support its active metal component, in particular, a carrier of a catalyst for acidic catalytic reaction such as those for hydrocracking of petroleum hydrocarbon materials to produce middle distillates. Accordingly, the present invention further provides a catalyst comprising an active metal component and the carrier combination according to the present invention as carrier component.

In the case that the carrier complex consists of the amorphous silica-alumina of the present invention. And the amorphous silica-alumina of the present invention can be used directly as a support a component with a large pore volume and a large specific surface area, as well as with a certain function for acidic cracking. Since the amorphous silica-alumina according to the present invention has a large pore volume and a large specific surface area, as well as a certain acidic function for acidic cracking reaction, the amorphous silica-alumina of the present invention can provide a carrier or catalyst with excellent properties; specifically, the large specific surface area makes the amorphous silica-alumina capable of supporting a large amount of metal components as well as improving the dispersion of the metal components onto the carrier surface to give full play to the catalyst's activity, while the large pore volume is beneficial for easy movement of the reactants and products in and out of the cavities of the catalyst, and thus improving the catalyst's diffusion property during reaction, and the acid sites can serve as the sites of acidic catalytic reaction.

The carrier complex according to the present invention can be used as a main carrier component for supporting the hydrogenation metal component. If the carrier complex contains no zeolite but only the silica-alumina of the present invention as acidic component, the hydrocracking catalyst comprising such a carrier complex belongs to the category of amorphous type hydrocracking catalysts. If the carrier complex contains a comparatively large amount of inert alumina, or has a decreased number of acid sites by moderating the silica content in silica-alumina, it can serve as a carrier of the mild cracking or hydrorefining catalyst.

Therefore, the present invention provides a catalyst comprising (a) active metal component, (b) the silica-alumina of the present invention, (c) optionally a crystalline compound including a zeolite component, and (d) optionally a binder.

In the case of a hydrotreating catalyst, the active metals are hydrogenation metals, which are preferably selected from the group consisting of Groups VIB and VIII metals, more preferably Mo and/or W, and Co and/or Ni. And the metal components are preferably metal oxides, most preferably molybdenum oxide and/or tungsten oxide, cobalt oxide and/or nickelous oxide.

The binder as a component of the catalyst of the present invention can be alumina and/or other small refactory oxide as defined above, preferably a small pore alumina, and more preferably a small pore alumina which is peptized with nitric acid and has a specific surface area of 240–280 $m^2/g$ and a pore volume of 0.4–0.5 ml/g.

The crystalline compound including a zeolite as a component of the catalyst of the present invention is that as defined above, preferably a zeolite-Y, and more preferably the modified ultra-hydrophobic zeolite-Y as defined above.

In the most preferable embodiment of the present invention, the catalyst of the present invention is a mid-distillate type hydrocracking catalyst comprising the ultra-hydrophobic zeolite-Y mentioned above as a main acidic component. The acidic property of the zeolite will provide the catalyst with relatively enhanced cracking activity; the large specific surface area and secondary pore structure will improve the dispersion of hydrogenation metals to give full play to the hydrogenation activity, and improve the pore distribution in the catalyst, thus being suitable for cracking oil distillates. In addition, the amorphous silica-alumina according to the invention is used as a supplement acidic component and a main carrier component of the catalyst, so it has a dual-function, i.e., for supplementing the acidic cracking function and serving as a main carrier component for supporting the hydrogenation metals.

The catalyst according to the invention has a specific surface area of 180–300 $m^2/g$, preferably 200–250 $m^2/g$; an IR acidity of 0.25–0.55 mmol/g, preferably 0.35–0.45 mmol/g; and a pore volume of 0.25–0.45 ml/g, preferably 0.3–0.4 ml/g.

In a preferred embodiment of the present invention, the catalyst preferably comprises a Group VIB metal component (calculated as oxide(s)) of 10–40 wt %, a Group VIII metal component (calculated as oxide(s)) of 1–20 wt %, a zeolite-Y of 0–40 wt %, the amorphous silica-alumina of the present invention of 10–70 wt %, and a binder of 0–40 wt %.

More preferably, the catalyst according to the present invention comprises a Group VIB metal component (calculated as oxide(s)) of 10–35 wt %, a Group VIII metal component (calculated as oxide(s)) of 1–15 wt %, a zeolite-Y of 5–40 wt %, the amorphous silica-alumina of 10–60 wt %, and a binder of 5–35 wt %.

Most preferably, the catalyst according to the present invention comprises Group VIB metal oxide (s) of 15–30 wt %, Group VIII metal oxide (s) of 2–10 wt %, the modified ultra-hydrophobic zeolite-Y of 10–30 wt %, the amorphous silica-alumina of 10–50 wt %, and a binder (calculated as dry alumina) of 10–30 wt %.

Most preferably, the catalyst according to the present invention comprises the ultra-hydrophobic zeolite-Y of 15–30 wt %, the amorphous silica-alumina of 20–40 wt %, a binder (calculated as dry alumina) of 5–30 wt %, and Group VIB metal oxide(s) of 18–28 wt % and Group VIII metal oxide(s) of 4–8 wt %.

The catalyst of the present invention can be prepared by a coprecipitation method, a co-mixing method, or an impregnation method.

In an embodiment of the present invention, the catalyst is prepared by an impregnation method, that is, by supporting active metals onto the carrier complex of the present invention by a conventional method such as impregnation to obtain the catalyst of the invention. Specifically, the catalyst of the present invention can be prepared by mixing the amorphous silica-alumina, optionally a crystalline compound including a zeolite, and optionally a binder, kneading, rolling and pressing the blend into block mass, and extrusion moulding the block mass by an extruder into carrier bars; and then supporting active metals onto said carrier to obtain the catalyst of the present invention.

For different purposes of use, the catalyst according to the present invention can be prepared following the above steps and by adjusting the catalyst's components and the contents thereof.

The formed catalyst can be in any suitable shape, for example, a cylindrical shape having a diameter of 1.2–1.8 mm, or be in a spherical shape or some specific shapes, such as those of trefoil or quatrefoil in cross-section. In general, it is moulded by an extruder into bars.

The preparation process of the catalyst according to the present invention is simple and convenient, easy to operate and suitable for industrial production.

The catalyst of the present invention features that it comprises an acidic amorphous silica-alumina having a large specific surface area and a large pore volume as defined in the present invention. The amorphous silica-alumina of the prior art has relatively small specific surface area and pore volume with the specific surface area rarely being more than 300 m$^2$/g, and in spite of that some have a specific surface area of more than 400 m$^2$/g, its specific surface area is contributed by small pore and result in comparatively small pore volume of product. So, when used as the carrier of a catalyst, the amorphous silica-alumina of the prior art needs generally to be combined with γ—Al$_2$O$_3$ to support a large amount of metal components. The process for the preparation of the silica-alumina of the present invention employs a specific precipitation method in steps rather than an impregnating method, a pH swinging preparation or other complicated colloid-forming method. The process for the preparation of the silica-alumina of the present invention can provide an amorphous silica-alumina having a large specific surface area and a large pore volume because it features that the formation of undesirable pore structure under the tendency of crystallization is avoided, thus ensuring the effective interaction of silicon and aluminum atoms to provide acid sites as well as a large specific surface area and large pore volume. Moreover, the process according to the present invention is advantageous because it is simple and easy to control, low energy consumption, and needs not specific equipment. The amorphous silica-alumina can have a pore volume of 0.8–1.5 ml/g, and can still have a large specific surface area and large pore volume even in a very wide range of high SiO$_2$ content. The large specific surface area makes the amorphous silica-alumina capable of supporting a large amount of metal components for hydrogenation, while the acid sites can provide it with adequate cracking activity. The large pore volume is beneficial for easy movement of the reactants and products in and out of the cavities of the catalyst, and thus minimizing the opportunity of secondary cracking reaction, while less carbon deposition will prolong the service life of the catalyst.

When used alone as a support component or catalyst component, the amorphous silica-alumina according to the present invention can also provide a comparatively high acidity. Said amorphous silica-alumina has appropriate acidity and acid strength and can provide relatively moderate cracking activity when matched with the zeolite Therefore, compared with the mid-distillate type hydrocracking catalyst prepared by the prior art, the mid-distillate type hydrocracking catalyst according to the present invention has the features of higher activity and obviously higher mid-distillate selectivity. Compared with the reference catalysts, the catalyst of the present invention exhibits better activity and mid-distillate selectivity in treating the same vacuum gas oils (VGO) under the same conditions.

The most preferable mid-distillate type hydrocracking catalyst according to the present invention is further characterized in that it comprises the ultra-hydrophobic zeolite-Y as mentioned above as a main acidic component. The modified zeolite-Y has an increased molar ratio of SiO$_2$/Al$_2$O$_3$ and a further decreased amount of solid acid.

After deeply dealuminized, said modified zeolite-Y has a decreased number of acid sites, and a decreased IR acidity of 0.25–0.55 mmol/g, preferably 0.3–0.5 mmol/g. Compared with the zeolite-Y prepared by the prior art, the zeolite used in the catalyst according to the present invention has a higher crystallinity, a larger specific surface area, and an added number of weak and moderate acid sites being formed with most of them being weak and moderate acid sites desorbed at a temperature ranging from 160 to 450° C. and the strong acid sites desorbed at >450° C. being less than 25%, (that is, after modified, the acid sites of the zeolite-Y have been decreased very much, but the strong acid sites have not been vanished completely), thus ensuring that no overcracking will occur, while a certain amount of strong acid sites can also ensure adequate cracking activity of the catalyst. The properties of pores, including the larger specific surface area and more secondary pores, shown in the modified zeolite used in the catalyst according to the invention enhance efficiently the hydrogenation activity which is advantageous to the increase in the activity of the ring-opening reaction of multi-ring aromatics or heterocyclics containing nitrogen, and provide more efficient reaction space to meet the requirements of the mid-distillate type hydrocracking catalyst for moderate cracking activity and high hydrogenation activity for cracking heavy hydrocarbon materials.

The catalyst according to the present invention is particularly useful in acidic catalytic reaction, for example, for hydrocracking of petroleum hydrocarbon materials to produce middle distillates. More particularly, the catalyst according to the invention is suitable for treating heavy hydrocarbon materials having a distillation range of 250–600° C., generally 300–550° C., for example, gas oils, vacuum gas oil distillates, deasphalted oils, cycle oils of FCC, shale oil, coal tars and the like. The hydrocracking reaction according to the invention is generally carried out at a temperature of 340–420° C. in the presence of hydrogen under a pressure of 5–30 Mpa, with the H/oil ratio (volume) being 100–5000) and the liquid hourly space velocity (herein after referred to as LHSV) being 0.1–5.0 h$^{-1}$. When the catalyst of the invention is used for treating conventional VGO, the hydrocracking reaction is generally carried out at a temperature of 370–410° C. in the presence of hydrogen under a pressure of preferably 10–20 MPa with the H$_2$/oil (volume) ratio being 500–2000 and the LHSV being 0.5–1.5 h$^{-1}$.

EXAMPLES

The present invention is further illustrated in detail with reference to the following examples which are provided for purposes of illustration and shall not be construed as limiting the present invention. Examples 1 to 9 relate to the preparation of the amorphous silica-alumina, Examples 10 to 13 relate to the preparation of the modified ultra-hydrophobic zeolite-Y, and Examples 14 to 20 relate to the preparation of the carrier complex and the catalyst of the present.

Example 1

This example relates to the preparation of the amorphous silica-alumina product S-1 according to the invention. 4000 g of solid aluminum sulfate was added to 7.5 L of distilled water with heating and stirring till it was dissolved to form an aluminum sulfate solution (a) with a concentration of 4 g Al$_2$O$_3$/100 ml. Some concentrate aqueous ammonia was diluted with an appropriate amount of distilled water into about 10% dilute aqueous ammonia (b). 10 L of distilled water was added to 4.8 L at of concentrate sodium silicate (industrial grade, modulus 3.0) to form a dilute sodium silicate solution (c). A 10 L reactor made of steel containing 2 L of distilled water was heated to 70° C. with stirring, in the meantime, the valves of containers containing aluminum sulfate solution (a) and aqueous ammonia (b) respectively were opened. The flow of (a) was set at such a rate that the neutralization reaction in this system was carried on for 1 hr to prepare 600 g of the amorphous silica-alumina product, with the flow of (b) being instantly adjusted to maintain the pH value of this system at 7–8, and the temperature of this system was maintained at about 65° C. After the reaction with aluminum sulfate was completed, addition of aqueous ammonia was terminated. The resulted alumina sol was stabilized for 15 mins, and then in order to obtain a final product containing the desired level of $SiO_2$, a calculated amount of the solution (c) (3.3 L) was added in 10 mins. This system was aged at pH 8.0 and a temperature of 60–65° C. for 50 mins. Then, the colloidal solution was filtered to give a wet filter cake. The filter cake was further slurried with distilled water, washed with water for several times to remove impurities, and filtered again to give a filter cake (d), which was dried at 110° C. for 8 hrs, crashed and sieved to obtain the amorphous silica-alumina product S-1.

Figure 2:
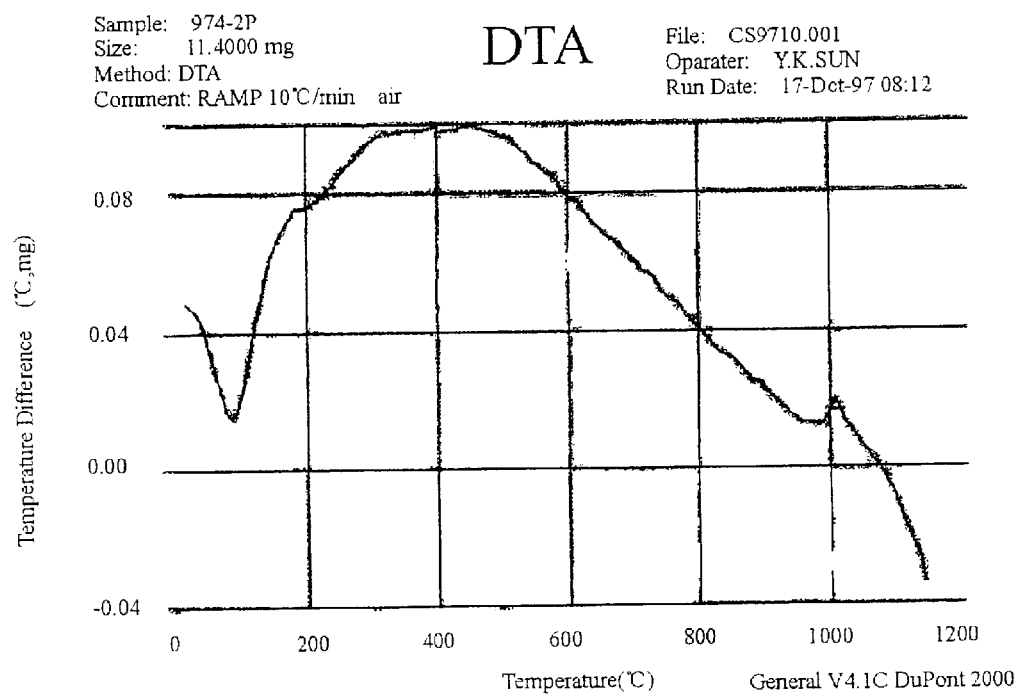
FIG. 2 is a DTA scan of an amorphous silica-alumina product.

FIG. 1 is a DTA figure of a pre-matrix of alumina in this example, analyzed by a differential thermal analyzer. FIG. 2 is a DTA figure of the amorphous silica-alumina product analyzed by a differential thermal analyzer. Though FIG. 1 shows that the pre-matrix exist really in certain crystal states, FIG. 2 shows only a water-desorbed peak at about 100° C. and a structure destroyed peak at about 1000° C., demonstrating that the silica-alumina of the present invention is in a high amorphous state.

Example 2

This example relates to the preparation of the amorphous silica-alumina product S-2 according to the invention. 8000 g of solid aluminum sulfate was added to about 7.5 L or distilled water with heating and stirring till it was dissolved to form an aluminum sulfate solution (a2) with a concentration of 8 g $Al_2O_3$/100 ml. Some concentrate aqueous ammonia was diluted with an appropriate amount of distilled water into about 10% dilute aqueous ammonia (b). A 10 L reactor made of steel containing 2 L of distilled water was heated to 70° C. with stirring, in the meantime, the valves of containers containing the aluminum sulfate solution (a2) and aqueous ammonia (b) respectively were opened. The flow of (a2) was set at such a rate that the neutralization reaction in this system was carried on for 2 hrs to prepare 600 g of the amorphous silica-alumina product, with the flow of (b) being instantly adjusted to maintain the pH value of this system at 7.0, and the temperature of this system was maintained at about 70° C. After the reaction with aluminum sulfate was completed, addition of aqueous ammonia was terminated, and then, in order to obtain a final product containing the desired level of $SiO_2$, a calculated amount of the solution (c) from example 1 (1.6 L) was added in 5 mins. Then, this system was aged at about pH 7.5 and a temperature of 65 to 70° C. for 60 mins. Then, the colloidal solution was filtered to give a wet filter cake, washed with water for several times to remove impurities and filtered again to obtain a filter cake (d). The filter cake (d) was further slurried, 17.6 ml phosphoric acid solution was added and the mixture was stirred for 30 mins, and then filtered again to give a filter cake (e), which was dried at 110° C. for 8 hrs, crashed and sieved to obtain the amorphous silica-alumina product S-2 which contains 3.0 wt % of $P_2O_5$.

Example 3

This example relates to the preparation of the amorphous silica-alumina product S-3 according to the invention. 3.2 L of a concentrate solution of aluminum sulfate (industrial grade) was added to 4.2 L of distilled water with heating and stirring to produce an aluminum sulfate solution (a3) with a concentration of 6 g $Al_2O_3$/100 ml. Concentrate aqueous ammonia was diluted with an appropriate amount of distilled water into about 10% dilute aqueous ammonia (b). A 10 L reactor made of steel containing 2 L of distilled water was heated to 70° C. with stirring, in the meantime, the valves of containers containing aluminum sulfate solution (a3) and aqueous ammonia (b) respectively were opened. The flow of (a3) was set at such a rate that the neutralization reaction in this system was carried on for 40 mins to prepare 600 g of the amorphous silica-alumina product, with the flow of (b) being instantly adjusted to maintain the pH value of this system at 9.0, and the temperature of this system was maintained at about 50–55° C. After the reaction with aluminum sulfate was completed, addition of aqueous ammonia was terminated. The resultant alumina sol was stabilized for 30 mins, and then, in order to obtain a final product containing the desired level of $SiO_2$, a calculated amount of the solution (c) from example 1 (1.4 L) was added in 10 mins. Then, this system was aged at about pH 9.0 and a temperature of 55 to 60° C. for 30 mins. Then, the colloidal solution was filtered to give a wet filter cake. Some distilled water was added again to the filter cake to slurry, washed with water for several times to remove impurities and filtered again to give a filter cake (d) which was dried at 110° C. for 8 hrs, crashed and sieved to obtain the amorphous silica-alumina product S-3 which contains 1.0 wt % of $P_2O_5$.

Example 4

This example relates to the preparation of the amorphous silica-alumina product S-4 according to the invention. 3.5 L of a concentrate solution of aluminum sulfate (industrial grade) was added to 4.0 L of distilled water with heating and stirring to produce an aluminum sulfate solution (a4) with a concentration of 8 g $Al_2O_3$/100 ml. Concentrate aqueous ammonia was diluted with an appropriate amount of distilled water into about 10% dilute aqueous ammonia (b). 5 L of distilled water was added to 2.4 L of concentrate sodium silicate (industrial grade, modulus 3.0) to form a dilute solution (c). A 10 L reactor made of steel containing 2 L of distilled water was heated to 70° C. with stirring, in the meantime, the valves of containers containing aluminum sulfate solution (a4) and aqueous ammonia (b) respectively were opened. The flow of (a4) was set at such a rate that the neutralization reaction in this system was carried on for 1.5 hrs to prepare 600 g of the amorphous silica-alumina product, with the flow of (b) being instantly adjusted to maintain the pH value of this system at 8.5, and the temperature of this system was maintained at about 55° C. After the reaction with aluminum sulfate was completed, addition of aqueous ammonia was terminated. The resultant alumina sol was stabilized for 15 mins, and then, in order to obtain a final product containing the desired level of $SiO_2$, a calculated amount of the solution (c) from example 1 (6.2 L) was added in 5 mins. Then, this system was aged at about pH 8.5 and a temperature of 60–65° C. for 15 mins. Then, the colloidal solution was filtered to give a wet filter cake. Some distilled water was added again to the filter cake to slurry, washed with water for several times to remove impurities and filtered again to give a filter cake (d) The filter cake (d) was further slurried with distilled water, then 31.5 ml phosphoric acid solution was added and the mixture was stirred for 30 mins, filtered to give a filter cake (e), which was dried at 10° C. for 8 hrs, crashed and sieved to obtain the amorphous silica-alumina product S-4 which contains 5.0 wt % of $P_2O_5$.

Example 5

This example relates to the preparation of the amorphous silica-alumina product S-5 according to the invention 9800 g of solid aluminum sulfate was added to 6.2 L of distilled water with heating and stirring till it was dissolved to form an aluminum sulfate solution (a5) with a concentration of 10 g $Al_2O_3$/100 ml. Concentrate aqueous ammonia was diluted with an appropriate amount of distilled water into about 10% dilute aqueous ammonia (b). A 10 L reactor made of steel containing 2 L of distilled water was heated to 70° C. with stirring, in the meantime, the valves of containers containing aluminum sulfate solution (a5) and aqueous ammonia (b) respectively were opened. The flow of (a5) was set at such a rate that the neutralization reaction in this system was carried on for 1 hr, with the flow of (b) being instantly adjusted to maintain the pH value of this system at 8.0, and the temperature of this system was maintained at 60° C. After the reaction with aluminum sulfate was completed, addition of aqueous ammonia was terminated. The resultant alumina sol was stabilized for 40 mins, and then, in order to obtain a final product containing the desired level of $SiO_2$, a calculated amount of the solution (c) from example 1 (2.0 L) was added in 10 mins. This system was aged at about pH 8.5 and a temperature of 50–55° C. for 40 mins. Then, the colloidal solution was filtered to give a wet filter cake. The filter cake was further slurried with distilled water, washed with water for several times to remove impurities, and filtered again to give a filter cake (d), which was dried at 110° C. for 8 hrs, crashed and sieved to obtain the amorphous silica-alumina product S-5.

Example 6

This example relates to the preparation of the amorphous silica-alumina product S-6 according to the invention. 4000 g of solid aluminum sulfate was added to 7.5 L of distilled water with heating and stirring till it was dissolved to form an aluminum sulfate solution (a6) with a concentration of 4 g $Al_2O_3$/100 ml. 40% aqueous NaOH (industrial grade) was diluted with an appropriate amount of distilled water into about 15% dilute solution (b). A 10 L reactor made of steel containing 2 L on distilled water was heated to 70° C. with stirring, in the meantime, the valves of containers containing aluminum sulfate solution (a6) and aqueous NaOH (b) respectively were opened. The flow of (a6) was set at such a rate that the neutralization reaction in this system was carried on for 110 mins to prepare 600 g of the amorphous silica-alumina product, with the flow of (b) being instantly adjusted to maintain the pH value of this system at 7.0, and the temperature of this system was maintained at 70° C. After the reaction with aluminum sulfate was completed, addition of aqueous NaOH was terminated, and then, in order to obtain a final product containing the desired level of $SiO_2$, a calculated amount of the solution (c) from example 1 (4.2 L) was added in 5 mins. This system was aged at pH 7.5 and a temperature of 65–70° C. for 60 mins. Then, the colloidal solution was filtered to give a wet filter cake. The filter cake was further slurried with distilled water, washed with water for several times to remove impurities, and filtered again to give a filter cake (d), which was dried at 100° C. for 8 hrs, crashed and sieved to obtain the amorphous silica-alumina product S-6.

Example 7

This example relates to the preparation of the amorphous silica-alumina product S-7 according to the invention. Concentrate sodium aluminate of industrial grade was added to 6.0 L of distilled water with heating and stirring to form a sodium aluminate solution (a7) with a concentration of 18 g $Al_2O_3$/100 ml. A 10 L reactor made of steel containing 2 L of distilled water was heated to 70° C. with stirring, in the meantime, the valves of containers containing aluminum sulfate solution (a1) from example 1 and aqueous sodium aluminate solution (a7) respectively were opened. The flows of (a7) and (a1) were set at such a rate that the neutralization reaction in this system was carried on for 1 hr to prepare 600 g of the amorphous silica-alumina product, with the flow of (b) being instantly adjusted to maintain the pH value of this system at 8.0, and the temperature of this system was maintained at 60° C. After the reaction with aluminum sulfate was completed, addition of aqueous ammonia was terminated. The resultant alumina sol was stabilized for 40 mins, and then, in order to obtain a final product containing the desired level of $SiO_2$, a calculated amount of the solution (c) From example 1 (3.3 L) was added in 10 mins. This system was aced at about pH 8.5 and a temperature of 50–55° C. for 40 mins. Then, the colloidal solution was filtered to give a wet filter cake. The filter cake was further slurried with distilled water, washed with water for several times to remove impurities, and filtered again to give a filter cake (d), which was dried at 110° C. for 8 hrs, crashed and sieved to obtain the amorphous silica-alumina product S-7.

Example 8

This example relates to the preparation of the amorphous silica-alumina product S-8 according to the invention. 3.0 L of concentrate aluminum chloride solution was added to 4 L of distilled water with heating and stirring to form an aluminum chloride solution (a8) with a concentration of 4 g $Al_2O_3$/100 ml. Concentrate aqueous ammonia was diluted with an appropriate amount of distilled water into about 10% dilute aqueous ammonia (b). A 10 L reactor made of steel containing 2 L of distilled water was heated to 70° C. with stirring, in the meantime, the valves of containers containing the aluminum chloride solution (a8) and aqueous ammonia (b) respectively were opened. The flow of (a8) was set at such a rate that the neutralization reaction in this system was carried on for 40 mins to prepare 600 g of the amorphous silica-alumina product, with the flow of (b) being instantly adjusted to maintain the pH value of this system at 9.0, and the temperature of this system was maintained at 50–55° C. After the reaction with aluminum chloride was completed, addition of aqueous ammonia was terminated. The resulted alumina sol was stabilized for 30 mins, and then, in order to obtain a final product containing the desired level of $SiO_2$, a calculated amount of the solution (c) from example 1 (2.0 L) was added in 10 mins. This system was aged at pH 9.0 and a temperature of 55–60° C. for 30 mins. Then, the colloidal solution was filtered to give a wet filter cake. The filter cake was further slurried with distilled water, washed with water for several times to remove impurities, and filtered again to give a filter cake (d), which was dried at 110° C. for 8 hrs, crashed and sieved to obtain the amorphous silica-alumina product S-8.

Example 9

This example relates to the preparation of the amorphous silica-alumina product S-9 according to the invention. 3.2 L of concentrate aluminum nitrate solution was added to 7 L of distilled water with heating and stirring to form an aluminum nitrate solution (a9) with a concentration of 6 g $Al_2O_3$/100 ml. Concentrate aqueous ammonia was diluted with an appropriate amount of distilled water into about 10% dilute aqueous ammonia (b). A 10 L reactor made of steel containing 2 L of distilled water was heated to 70° C. with stirring, in the meantime, the valves of containers containing aluminum nitrate solution (a9) and aqueous ammonia (b) respectively were opened. The flow of (a9) was set at such a rate that the neutralization reaction in this system was carried on for 1.5 hrs to prepare 600 g of the amorphous silica-alumina product, with the flow of (b) being instantly adjusted to maintain the pH value of this system at 8.5, and the temperature of this system was maintained at 55° C. After the reaction with aluminum nitrate was completed, addition of aqueous ammonia was terminated. The resulted alumina sol was stabilized for 15 mins, and then, in order to make the final product to contain the desired level of $SiO_2$, a calculated amount of the solution (c) from example 1 (1.0 L) was added in 5 mins. This system was aged at about pH 8.5 and a temperature of 60–65° for 15 mins. Then, the colloidal solution was filtered to give a wet filter cake. The filter cake was further slurried with distilled water, washed with water for several times to remove impurities, and filtered again to give a filter cake (d), which was dried at 110° C. for 8 hrs, crashed and sieved to obtain the amorphous silica-alumina product S-9.

100% water vapor for 6 hours to obtain the ultra-hydrothobic zeolite-Y (No. A) to be used in the catalyst according to the invention. The physical and chemical properties of the zeolite are shown in Table 2.

Example 11

This example relates to the preparation of the ultra-hydrophobic zeolite-Y (No. 3) according to the invention. (1) 5.0 kg of zeolite NaY (the same as that in Example 1) was added to 50 liters of the 2M $NH_4NO_3$ solution, and ion-exchanged at 100° C. with stirring for 2 hours for two times, then the resulting mixture was filtered, washed to neutrality, and dried to obtain the product I; (2) the product I was placed in the high pressure rotary oven and calcined at 550° C. under a pressure of 0.1 MPa with 100% water vapor for 2 hours to obtain the product II; (3) the product II was added to 50 liters of the 2M $NH_4NO_3$ solution, then ion-exchanged with stirring at 100° C. for 2 hours for three times, and then filtered and washed with water to neutrality, and dried to obtain the product III; (4) the product III was placed in a high pressure rotary oven and calcined at 550° C. under a pressure of 0.2 MPa with 100% water vapor for 4 hours to obtain the ultra-hydrophobic zeolite-Y (No. B) to be used in the catalyst according to the invention. The physical and chemical properties of the zeolite are shown in Table 2.

Example 12

This example relates to the preparation of the ultra-hydrophobic zeolite-Y (No. C) according to the invention.

TABLE 1

The properties of the amorphous silica-alumina products

| Amorphous Silica-alumina | $SiO_2$ (w %) | Specific Surface Area (m²/g) | Pore Volume (ml/g) | Pore Diameter (X10⁻¹⁰m) | IR acidity (mmol/g) |
| --- | --- | --- | --- | --- | --- |
| S-1 | 30 | 530 | 1.44 | 111 | 0.48 |
| S-2 | 20 | 504 | 1.30 | 110 | 0.44 |
| S-3 | 15 | 390 | 0.91 | 94 | 0.36 |
| S-4 | 45 | 452 | 1.15 | 102 | 0.54 |
| S-5 | 25 | 433 | 1.12 | 98 | 0.45 |
| S-6 | 35 | 355 | 0.89 | 89 | 0.28 |
| S-7 | 30 | 372 | 1.01 | 97 | 0.31 |
| S-8 | 20 | 483 | 1.22 | 106 | 0.36 |
| S-9 | 10 | 471 | 1.19 | 102 | 0.26 |
| Comparative | 0 | 390 | 1.05 | 94 | 0.22 |
| Comparative Amorphous Silica-alumina | 60 | 280 | 0.65 | 71 | 0.55 |

Note:
The comparative alumina and the comparative amorphous silica-alumina were availabe from Fushun NO. 3 Petroleum Factory.

Example 10

This example relates to the preparation of the ultra-hydrophobic zeolite-Y (No. A) according to the invention. (1) To an 1M³ ion-exchanging vessel with enamel inner-lining, 130 kg $NH_4NO_3$ (product of industrial grade with a purity of >99.5%, available from the Dalian Chemical Factory) and 800 L industrially purified water were added to prepare a 2M $NH_4NO_3$ solution, then the solution was heated to 70° C., 120 kg zeolite NaY (50 wt % calculated as dry basis, product available from the Wenzhou Catalyst Factory) was added, and ion-exchanged with stirring at 70° C. for 3 hours. This exchanging step was repeated for 12 times. Then, the resulting mixture was filtered and washed with water to neutrality, and dried to obtain the zeolite-Y having a $Na_2O$ content of 0.18%. (2) The washed and dried zeolite obtained above was placed in a high pressure rotary oven, with the temperature being rapidly raised to 650° C. and calcined under a pressure of 0.4 MPa in the presence of (1) 2.0 kg of zeolite NaY (the same as that in Example 2) was added to 160 liters of the 3M $NH_4NO_3$ solution, and ion-exchanged at 150° C. with stirring for 0.5 hour for 12 times to obtain the zeolite-Y with a $Na_2O$ content of 0.17 wt %, then dried to obtain the product I; (2) the product I was placed in a high pressure rotary oven and calcined at 700° C. under 0.1 MPa pressure with 100% water vapor for 4 hours to obtain the product II; (3) 400 g of the product II was added to 4 liters of 0.4M hydrochloric acid solution and treated for 2 hours, then filtered and washed to neutrality, and dried to obtain the ultra-hydrophobic zeolite-Y (No. C) to be used in the catalyst according to the invention. The physical and chemical properties of the zeolite are shown in Table 2.

Example 13

This example relates to the preparation of the ultra-hydrophobic zeolite-Y (No. D) according to the invention. 100 g ultra-hydrophobic zeolite-Y (No. A) from Example 1 was added to 1 liter of the 0.4M acetylacetone solution and treated for 2 hours, then filtered and washed with 3 liters of deionized water, then dried to obtain the ultra-hydrophobic zeolite-Y (No. D) to be used in the catalyst according to the invention. The physical and chemical properties of the zeolite are shown in Table 2.

TABLE 2

The physical and chemical properties of the ultra-hydrophobic zeolite-Y (Nos. A, B, C and D)

| | Example No. | | | |
|---|---|---|---|---|
| | 10 | 11 | 12 | 13 |
| | Zeolite No. | | | |
| | A | B | C | D |
| Ratio of Non-skeletal Al/Total Al (%) | 45 | 40 | 35 | 10 |
| Secondary Pores (>2 nm, %) | 50 | 52 | 56 | 54 |
| IR acidity (mmol/g) | 0.22 | 0.33 | 0.55 | 0.30 |
| Na$_2$O Content (wt %) | 0.15 | 0.14 | 0.10 | 0.11 |
| Specific Surface Area by a BET Method (m$^2$/g) | 630 | 660 | 780 | 840 |
| Molar Ratio of SiO$_2$/Al$_2$O$_3$ | 5.2 | 6.0 | 13.0 | 23.9 |
| Crystal Unit Cell Size (nm) | 2.430 | 2.432 | 2.428 | 2.430 |
| Ion-exchanging Capacity | 0.051 | 0.045 | 0.057 | 0.053 |
| Residual Butanol Test Value | 0.22 | 0.25 | 0.15 | 0.17 |
| Sorptive Capacity for Water Vapor at 25° C. and p/p$_o$ = 0.1 wt % | 4.3 | 2.1 | 4.0 | 4.5 |

Example 14

This example relates to the preparation of the carrier SA and the catalyst (Cat.A) according to the invention. 22.7 g of the zeolite-Y having a molar ratio of SiO$_2$/Al$_2$O$_3$ of 12, an IR acidity of 0.94 mmol/g, a crystal unit cell size of 2.448 nm, a sorptive capacity for water vapor of 32 wt % at 25° C. and p/p0=0.1 (manufactured by the Catalyst Factory of the Fushun Petro-chemical Corporation) and 102.8 g of the amorphous silica-alumina product S-3 from Example 3 according to the invention and were weighed and mixed homogeneously, then 278 g of a jelly binder prepared by peptizing the small pore alumina having a pore volume of 0.42 ml/g with nitric acid was added to the resulting mixture, rolled and pressed into mass, and extruded by an extruder into bars, which were dried at 110° C. for 10 hours and activated at 500° C. for 4 hours to obtain the carrier SA. 60 g of the carrier SA was saturatedly impregnated in 48 ml of a co-impregnation solution containing W and Ni so that the catalyst finally contained 7 wt % nickel oxide and 22 wt % tungsten oxide, then the impregnated carrier was dried at 110° C. for 12 hours and activated at 500° C. for 3 hours to obtain the catalyst Cat.A. The final catalyst consisted of silica-alumina of 36 wt %, zeolite of 10 wt %, alumina of 25 wt %, nickelous oxide of 7 wt % and tungsten oxide of 22 wt %. The physic-chemical properties of the carrier and catalyst are shown in Table 3.

Example 15

This example relates to the preparation of the carrier SB and the catalyst (Cat.B) according to the invention. 55.5 g of the zeolite-β having a molar ratio of SiO$_2$/Al$_2$O$_3$ of 70, an IR acidity of 0.28 mmol/g (manufactured by the Catalyst Factory of the Fushun Petro-chemical Corporation, comercial brand CPB) and 88.6 g of the amorphous silica-alumina product S-3 from Example 3 according to the invention and were weighed and mixed homogeneously, then 168 g of a jelly binder prepared by peptizing the small pore alumina having a pore volume of 0.42 mg/l with nitric acid was added to the resulting mixture, rolled and pressed into mass, and extruded by an extruder into bars, which were dried at 110° C. for 10 hours and activated at 500° C. for 4 hours to obtain the carrier SB. 60 g of the carrier SB was saturatedly impregnated in 48 ml of a co-impregnation solution containing W and Ni so that the catalyst finally contained 7 wt % nickel oxide and 22 wt % tungsten oxide, then the impregnated carrier was dried at 110° C. for 12 hours and activated at 500° C. for 3 hours to obtain the catalyst Cat. B. The final catalyst consisted of silica-alumina of 31 wt %, zeolite of 25 wt %, alumina of 15 wt %, nickelous oxide of 7 wt % and tungsten oxide of 22 wt %. The physic-chemical properties of the carrier and catalyst are shown in Table 3.

Comparative Example 1

This comparative example relates to the reference carrier SC and reference catalyst Cat.C. 118.8 g of the silica-alumina having a specific surface area of 280 m$^2$/g, a pore volume of 0.76 ml/g and a SiO$_2$ content of 35 wt % (an industrial silica-alumina product manufactured by the Catalyst Factory of the Fushun Petro-chemical Corporation) and 22.7 g of the zeolite-Y which was the same as that in example 14 were weighed and mixed homogeneously, then 278 g of a jelly binder prepared by peptizing the small pore alumina having a pore volume of 0.42 ml/g with nitric acid was added to the resulting mixture, rolled and pressed into mass, and extruded by an extruder into bars, which were dried and activated to obtain the carrier SC. 60 g of the carrier SC was saturatedly impregnated in 48 ml of a co-impregnation solution containing W, and Ni, then the impregnated carrier was dried and activated to obtain the reference catalyst Cat.C. The conditions for drying and activation were the same as those in Example 14. The final catalyst consisted of silica-alumina of 36 wt %, zeolite of 10 wt %, alumina of 25 wt %, nickelous oxide of 7 wt % and tungsten oxide of 22 wt %. The physic-chemical properties of the carrier and catalyst are shown in Table 3.

Example 16

This example relates to the preparation of the carrier SD and the catalyst (Cat.D) according to the invention. 12.6 g of the amorphous silica-alumina product S-4 from Example 4 according to the invention and 11.1 g of the zeolite-Y (No. B) from Example 11 according to the invention were weighed and mixed homogeneously, then 250 g of a binder prepared by peptizing 71.4 g of the small core alumina having a pore volume of 0.42 ml/g with dilute nitric acid was added to the resulting mixture, rolled and pressed into mass, and extruded by an extruder into bars, which were dried at 110° C. for 10 hours and activated at 300° C. for 4 hours to obtain the carrier SD, which was impregnated in a co-impregnation solution containing Mo and Ni, then the impregnated carrier was dried at 110° C. for 12 hours and activated at 500° C. for 3 hours to obtain the catalyst Cat.D, which finally consisted of silica-alumina of 45 wt %, zeolite of 5 wt %, alumina of 25 wt %, nickelous oxide of 5 wt % and molybdenum oxide of 20 wt %. The physic-chemical properties of the carrier and catalyst are shown in Table 3.

Example 17

This example relates to the preparation of the carrier SE and the catalyst (Cat-E) according to the invention. 88.7 g of the amorphous silica-alumina product S-8 from Example 8 according to the invention and 45.4 g of the zeolite-Y from Example 10 according to the invention were weighed and mixed homogeneously, then 222 g of a binder prepared by peptizing 57.1 g of the small core alumina having a pore volume of 0.42 ml/g with dilute nitric acid was added to the resulting mixture, rolled and pressed into mass, and extruded by an extruder into bars, which were dried at 110° C. for 10 hours and activated at 500° C. for 4 hours to obtain the carrier SE, which was impregnated in a co-impregnation solution containing W and Ni, then the impregnated carrier was dried at 110° C. for 12 hours and activated at 500° C. for 3 hours to obtain the catalyst Cat. E, which finally consisted of silica-alumina of 30 wt %, zeolite of 20 wt %, alumina of 20 wt %, nickelous oxide of 7.5 wt % and tungsten oxide of 22.5 wt %. The physic-chemical properties of the carrier and catalyst are shown in Table 3.

Example 18

This example relates to the preparation of the carrier SF and the catalyst (Cat.F) according to the invention. 64.7 g of the amorphous silica-alumina product S-3 from Example 3 according to the invention and 66.5 g of the zeolite-Y from Example 13 according to the invention were weighed and mixed homogeneously, then 167 g of a binder prepared by peptizing 42.0 g of the small pore alumina having a pore volume of 0.42 ml/g with dilute nitric acid was added to the resulting mixture, rolled and pressed into mass, and extruded by an extruder into bars, which were dried at 110° C. for 10 hours and activated at 500° C. for 4 hours to obtain the carrier SF, which was impregnated in a co-impregnation solution containing W and Ni, then the impregnated carrier was dried at 110° C. for 12 hours and activated at 500° C. for 3 hours to obtain the catalyst Cat. F which finally consisted of silica-alumina of 20 wt %, zeolite of 30 wt %, alumina of 15 wt %, nickelous oxide of 7.5 wt % and tungsten oxide of 22.5 wt %. The physic-chemical properties of the carrier and catalyst are shown in Table 3.

Example 19

This example relates to the carrier SG and the catalyst (Cat.G) according to the invention. 184.6 g of the amorphous silica-alumina product S-7 from Example 7 according to the invention and 89.8 g of the zeolite-Y from Example 12 according to the invention were weighed and mixed homogeneously, then 310 ml diluted nitrate of 3.9 v % was added to the resulting mixture, rolled and pressed into mass, and extruded by an extruder into bars, which were dried at 110° C. for 10 hours and activated at 500° C. for 4 hours to obtain the carrier SG, which was impregnated in a co-impregnation solution containing W and Nor, then the impregnated carrier was dried at 110° C. for 12 hours and activated at 500° C. for 3 hours to obtain the catalyst Cat.G, which finally consisted of silica-alumina of 60 wt %, zeolite of 40 wt %, nickelous oxide of 7.5 wt % and tungsten oxide of 22.5 wt %.

Comparative Example 2

This comparative example relates to the reference carrier SH and the reference catalyst (Cat.H). The reference carrier and the reference catalyst were prepared according to the same procedure as described in Example 17 except that the amorphous silica-alumina was substituted with a commercial silica-alumina (having a specific surface area of 260 ml/g and a pore volume of 0.76 ml/g, available from the Catalyst Factory under Fushun Petro-chemical SINOPEC, the P. R. China). The final catalyst consisted of silica-alumina of 30 wt %, zeolite of 20 wt %, alumina of 20 wt %, nickelous oxide of 7.5 wt % and tungsten oxide of 22.5 wt %. The physic-chemical properties of the carrier and catalyst are shown in Table 3.

Comparative Example 3

This comparative example relates to the reference catalyst (Cat.I). The reference catalyst was a and middle distillate type hydrocracking catalyst which is commercially available from the international market and focus on produing middle distillates. Aanalyzation by XRD show that it contains a zeolite component having properties of zeolite-Y, a silica-alumina, an alumina and supported hydrogenation tungsten and nickel component.

Example 20

This example relates to the preparation of the carrier SJ and the catalyst (Cat.J) according to the invention. 151.5 g of the amorphous silica-alumina product S-4 from Example 4 according to the invention and 222 g of a hinder prepared by peptizing 55.2 g of the small pore alumina having a pore volume of 0.42 ml/g with dilute nitric acid was added to the resulting mixture, rolled and pressed into mass, and extruded by an extruder into bars, which were dried at 110° C. for 10 hours and activated at 500° C. for 4 hours to obtain the carrier SJ, which was impregnated in a co-impregnation solution containing W and Ni, then the impregnated carrier was dried at 110° C. for 12 hours and activated at 500° C. for 3 hours to obtain the catalyst Cat.J, which finally consisted of silica-alumina of 50 wt %, alumina of 20 wt %, nickelous oxide of 7.5 wt % and tungsten oxide of 22.5 wt %. The physic-chemical properties of the carrier and catalyst are shown in Table 3.

Comparative Example 4

This comparative example relates to the reference carrier SK and reference catalyst Cat.K. The preparation is the same as Example 20 except that 155.8 g of the silica-alumina having a specific surface area of 280 ml/g, a pore volume of 0.76 ml/g and a $SiO_2$ content of 35 wt % (an industrial silica-alumina product manufactured by the Catalyst Factory of the Fushun Petro-chemical Corporation) was added. The final catalyst consisted of silica-alumina of 50 wt %, alumina of 20 wt %, nickelous oxide of 7.5 wt % and tungsten oxide of 22.5 wt %. The physic-chemical properties of the carrier and catalyst are shown in Table 3.

All the catalysts according to the invention and the reference catalysts were evaluated by their performances. The evaluation was carried out with Shengli VGO as the feed oil under a pressure of 14 MPa, a $H_2$/oil volume ratio of 1500 and a LHSV of 1.5 $h^{-1}$. Main properties of the feed oil are shown in Table 4. The evaluation for the catalyst activity was measured by comparing the reaction temperatures at which the same 65 v % conversion could be achieved in once through process using the tested catalyst, and the evaluation of the catalyst for mid-distillate selectivity was carried out according to the product distributions at a given conversion, in which the mid-distillate selectivity was calculated by "the ratio of the liquid yield of middle distillates to the total liquid yield of the products having a distillation range below 370° C.". The evaluation results of the catalysts are shown in Table 5.

It can be seen from the data and the physic-chemical properties of the carriers and the catalysts shown in Table 3 that the carriers and catalysts from the comparative examples have smaller pore volume and lower specific surface area, which will undoubtedly affect the dispersion or metals and their hydrogenation activity. Moreover, in spite of combination with the zeolite of exceedingly strong acidity, substantial improvement in the mid-distillate selectivity of catalyst from Ex. 14 is achieved as compared with that from Comp. Ex. 1. The evaluation results in Table 5 also show that when used for treating a heavy feed oil having high aromatic content and high dry point of distillation range with a conversion of not less than 65 vol %, the catalysts of the present invention exhibit a mid-distillate selectivity generally of not less than 80%, while the reaction temperature is generally not higher than 388° C. These indicate that the catalysts according to the present invention have an excellent mid-distillate selectivity, as well as a relatively high activity. Table 5 also indicates that different desired products can be obtained by combining different zeolites with the amorphous silica-alumina of the present invention. The products with low solidifying point in broad distillate range were obtained in Example 15 by combining a kind of Beta zeolite with the silica-alumina, in the meantime mid-distillate selectivity can be reached. Comparing Ex. No. 20 with Comp. Ex. No. 4, it can also be seen that the activity and selectivity of the catalyst comprising the silica-aluminum of this invention from Ex. No. 20 are better evidently that that of the catalyst from Comp. Ex. No.4.

TABLE 3

Physic-chemical properties of the carriers and catalysts

| Ex or Comp. Ex. No. | Carrier or Catalyst No. | Specific Surface Area (m²/g) | Pore Volume (ml/g) | IR Acidity (mmol/g) |
|---|---|---|---|---|
| Ex. No. 14 | SA | 401 | 0.68 | — |
| Ex. No. 14 | Cat. A | 226 | 0.35 | 0.40 |
| Ex. No. 15 | SB | 395 | 0.66 | — |
| Ex. No. 15 | Cat. B | 213 | 0.40 | 0.34 |
| Comp. Ex. No. 1 | SC | 303 | 0.55 | — |
| Comp. Ex. No. 1 | Cat. C | 188 | 0.26 | |
| Ex. No. 16 | SD | 398 | 0.73 | — |
| Ex. No. 16 | Cat. D | 254 | 0.38 | 0.32 |
| Ex. No. 17 | SE | 406 | 0.70 | — |
| Ex. No. 17 | Cat. E | 240 | 0.35 | 0.35 |
| Ex. No. 18 | SF | 415 | 0.60 | — |
| Ex. No. 18 | Cat. F | 275 | 0.30 | 0.38 |
| Ex. No. 19 | SG | 428 | 0.56 | — |
| Ex. No. 19 | Cat. G | 268 | 0.29 | 0.42 |
| Comp. Ex. No. 2 | SI | 367 | 0.57 | — |
| Comp. Ex. No. 2 | Cat. I | 215 | 0.27 | — |
| Comp. Ex. No. 3 | Cat. J | 218 | 0.29 | — |
| Ex. No. 20 | SK | 391 | 0.76 | |
| Ex. No. 20 | Cat. K | 192 | 0.43 | 0.31 |
| Comp. Ex. No. 4 | SL | 272 | 0.54 | — |
| Comp. Ex. No. 4 | Cat. L | 148 | 0.21 | — |

Note:
"—" indicates not detected.

TABLE 4

Properties of the feed oil

| Density ($d_1^{20}$) | 0.9066 |
|---|---|
| Distillation Range (° C.) | |
| IBP | 346 |
| 10% | 388 |
| 50% | 433 |
| 90% | 489 |
| EP | 526 |
| Analysis by mass spectra (wt %) | |
| Paraffins | 18.3 |
| Naphthenes | 43.1 |
| Aromatics | 34.8 |

TABLE 4-continued

Properties of the feed oil

| Gum | 3.8 |
|---|---|
| Residual carbon (wt %) | 0.01 |
| S (wt %) | 0.59 |
| N ($\mu$ g/g) | 1419 |
| BMCI value | 43.2 |

TABLE 5

The Evaluation Results of the Catalysts

| Ex or Comp. Ex. No. | Catalyst No. | Reaction temperature (° C.) | Mid-distillate selectivity (%) |
|---|---|---|---|
| Ex. No. 14 | Cat. A | 380 | 79.5 |
| Ex. No. 15 | Cat. B | 382 | 81.4 |
| Comp. Ex. No. 1 | Cat. C | 382 | 76.6 |
| Ex. No. 16 | Cat. D | 387 | 84.2 |
| Ex. No. 17 | Cat. E | 378 | 82.0 |
| Ex. No. 18 | Cat. F | 372 | 80.8 |
| Ex. No. 19 | Cat. G | 370 | 80.5 |
| Comp. Ex. No. 2 | Cat. H | 383 | 78.3 |
| Comp. Ex. No. 3 | Cat. I | 392 | 81.5 |
| Ex. No. 20 | J | 412 | 87.0 |
| Comp. Ex. No. 4 | Cat. K | 420 | 85.5 |

What is claimed is:

1. An amorphous silica-alumina having a $SiO_2$ content of 10–50 wt %, a specific surface area of 300–600 m²/g, a pore volume of 0.8–1.5 ml/g, and an IR acidity of 0.25–0.60 mmol/g.

2. The amorphous silica-alumina according to claim 1, having the $SiO_2$ content of 15–50 wt %, or the $SiO_2$ content of 20–40 wt %.

3. The amorphous silica-alumina according to claim 1, wherein the specific surface area is 350–600 m²/g, 400–550 m²/g or 450–500 m²/g.

4. The amorphous silica-alumina according to claim 1, wherein the pore volume is 0.9–1.4 ml/g, 1.0–1.4 ml/g or 1.0–1.3 ml/g.

5. The amorphous silica-alumina according to claim 1, wherein the IR acidity is 0.30–0.55 mmol/g, 0.35–0.50 mmol/g or 0.40–0.45 mmol/g.

6. The amorphous silica-alumina according to claim 1, further having a phosphorus content of 1–5 wt % calculated as $P_2O_5$.

7. A process for the preparation of an amorphous silica-alumina according to claim 6, comprising the steps of:

(a) adding in parallel flows an acidic aluminum salt solution and a basic precipitant solution, or a basic aluminum salt solution and an acidic precipitant solution, into a reactor containing a small amount of de-ionized water and carrying out a neutralization reaction at a temperature of 50–80° C., a pH value of 6.0–10.0 for 0.5–2 hrs to form a colloidal sol;

(b) stabilizing the colloidal sol from step (a) at a pH value of 6–9 for 0–60 mins to obtain a resulting precursor;

(c) adding a silicon compound to the resulting precursor for step (b) in 5–20 mins to form a precursor mixture;

(d) aging precursor mixture from step (c) at a pH value of 7.5–9.5 and a temperature of 50–70° C. for 0–60 mins to thus obtain an aged precursor mixture;

(e) filtering and washing the aged precursor mixture from step (d); and (f) where necessary, adding a phosphorus compound, filtering the precursor mixture; and (g) drying the precursor mixture from step (e) or (f) at a temperature of 90–120° C. and crushing it to obtain the amorphous silica-alumina product.

8. The process according to claim 7, wherein the concentration of the acidic aluminum salt used in step (a) is 4–20 g/100 ml.

9. The process according to claim 7, wherein the silicon compound used in step (c) is one or more compounds selected from the group consisting of silicate, organic silicon compound, waterglass, sodium silicate and silica sol.

10. A process for the preparation of an amorphous silica-alumina according to claim 1 comprising the steps of:
   (a) adding in parallel flows an acidic aluminum salt solution and a basic precipitant solution, or a basic aluminum salt solution and an acidic precipitant solution, into a reactor containing a small amount of de-ionized water and carrying out a neutralization reaction to form a colloidal sol;
   (b) optionally, stabilizing the colloidal sol from step (a) to obtain a resulting precursor;
   (c) adding a silicon compound to the resulting precursor for step (b) to form a precursor mixture;
   (d) aging the precursor mixture from step (c) to thus obtain an aged precursor mixture;
   (e) filtering and washing the aged precursor mixture from step (d); and
   (f) where necessary, adding a phosphorus compound, filtering the precursor mixture; and
   (g) drying the precursor mixture from step (e) or (f) at a temperature of 90–120° C. and crushing it to obtain the amorphous silica-alumina product.

11. The process according to claim 10, wherein the acidic aluminum salt used in step (a) is one or more salts selected from the group consisting of aluminum sulfate, aluminum chloride and aluminum nitrate.

12. The process according to claim 10, wherein the basic precipitant used in step (a) is one or more precipitants selected from the group consisting of sodium hydroxide, sodium aluminate and aqueous ammonia.

13. A carrier complex, comprising:
   (a) 10–90 wt % of the amorphous silica-alumina according to claim 1,
   (b) 0–60 wt % of a crystalline compound including a zeolite component, and
   (c) 0–60 wt % of an alumina and/or other refractory oxides.

14. The carrier complex according to claim 13, comprising:
   (a) 15–80 wt % of the amorphous silica-alumina having a $SiO_2$ content of 15–50 wt %, a specific surface area of 300–600 $m^2/g$, a pore volume of 0.9–1.4 ml/g, and an IR acidity of 0.30–0.55 mmol/g,
   5–50 wt % of a crystalline compound including a zeolite component, and
   (c) 10–40 wt % of an alumina and/or other refractory oxides.

15. The carrier complex according to claim 13, comprising:
   (a) 20–70 wt % of the amorphous silica-alumina according to claim 1,
   (b) 10–40 wt % of a crystalline compound including a zeolite component, and
   (c) 10–40 wt % of an alumina and/or other refractory oxides.

16. The carrier complex according to claim 13, wherein said amorphous silica-alumina has a $SiO_2$ content of 20–40 wt %, a specific surface area of 400–550 $m^2/g$, a pore volume of 1.0–1.4 ml/g, and an IR acidity of 0.35–0.50 mmol/g.

17. The carrier complex according to claim 13, wherein said amorphous silica-alumina has a specific surface area of 450–500 $m^2/g$, a pore volume of 1.0–1.3 ml/g, and an IR acidity of 0.40–0.45 mmol/g.

18. The carrier complex according to claim 13, wherein said crystalline compound is one or more compounds selected from the group consisting of zeolite-Y, zeolite-β, zeolite-ZSM, and zeolite-SAPO.

19. The carrier complex according to claim 18, wherein said zeolite-Y is a modified ultra-hydrophobic zeolite-Y having a $SiO_2/Al_2O_3$ molar ratio of 5–25, a crystal unit cell size of 2.420–2.445 nm, an IR acidity of 0.2–0.6 mmol/g, a sorptive capacity for water vapor of less than 5 wt % at 25° C. and $P/P_o$ of 0.1, and a specific surface area of 600–850 $m^2/g$.

20. The carrier complex according to claim 19, wherein said zeolite-Y is a modified ultra-hydrophobic zeolite-Y having a $SiO_2/Al_2O_3$ molar ratio of 6.0–17, a crystal unit cell size of 2.425–2.435 nm, a specific surface area of 700–800 $m^2/g$, a pore volume of 0.30–0.50 ml/g, and an IR acidity of 0.25–0.55 mmol/g, with more than 50% of the total pore volume being contributed by the secondary pores having a pore diameter of >2 nm.

21. The carrier complex according to claim 13, wherein said alumina is a large pore alumina and/or a small pore alumina, and said refractory oxide is zinc oxide, zirconium oxide, titanium oxide and/or magnesium oxide.

22. The carrier complex according to claim 21, wherein said alumina is a small pore alumina which is peptized with nitric acid and has a specific surface area of 240–280 $m^2/g$ and a pore volume of 0.4–0.5 ml/g.

* * * * *